United States Patent [19]
Pickert et al.

[11] Patent Number: 4,794,525
[45] Date of Patent: Dec. 27, 1988

[54] EXTERNAL INTERFACE CONTROL CIRCUITRY FOR MICROCOMPUTER SYSTEMS

[75] Inventors: William F. Pickert; Joseph M. Pettinger, both of Hoffman Estates; Peter Biancalana, Chicago, all of Ill.

[73] Assignee: Motorola, Inc., Schaumburg, Ill.

[21] Appl. No.: 13,227

[22] Filed: Feb. 4, 1987

Related U.S. Application Data

[63] Continuation of Ser. No. 618,115, Jun. 7, 1984, abandoned.

[51] Int. Cl.$^4$ ............................ G06F 1/00; G06F 11/30
[52] U.S. Cl. ........................................ 364/200; 364/900
[58] Field of Search ... 364/200 MS File, 900 MS File

[56] References Cited

U.S. PATENT DOCUMENTS

| | | | |
|---|---|---|---|
| 4,171,539 | 10/1979 | Tawfik et al. | 364/900 |
| 4,233,666 | 11/1980 | Walberg et al. | 364/900 |
| 4,307,455 | 12/1981 | Juhasz et al. | 364/900 |
| 4,312,035 | 1/1982 | Greene | 364/200 |
| 4,495,568 | 1/1985 | Gilbert et al. | 364/200 |
| 4,593,349 | 6/1986 | Chase et al. | 364/200 |

FOREIGN PATENT DOCUMENTS

| | | |
|---|---|---|
| 31018 | 2/1982 | Japan . |
| 106924 | 7/1982 | Japan . |
| 154026 | 9/1983 | Japan . |
| 2130405 | 5/1984 | United Kingdom . |

*Primary Examiner*—Gareth D. Shaw
*Assistant Examiner*—Christina Eakman
*Attorney, Agent, or Firm*—Rolland R. Hackbart

[57] ABSTRACT

External interface control circuitry is described that couples a microcomputer system (100) to an external device (800). The control circuitry includes a microcomputer (102), a power switch (108) for applying power to the external device (800) in response to a PSC* signal, bus control (104) for gating interface signals from the microcomputer (102) with a PD* signal for application to the external device (800) and a peripheral interface adapter (106) for producing the PC and PD* signals and coupling the PI* and READY*/IRQ* signals to the microcomputer (102). A power-up sequence is executed by the microcomputer (102) in response to grounding the PI* signal when the external device (800) is plugged into the microcomputer system (100). Next, the external device (800) produces a binary zero state of the READY*/IRQ* signal, and in response microcomputer (102) produces a binary one state of the PD* signal and thereafter the PC signal. The sequence is then completed when the external device (800) returns the READY*/IRQ* signal to the binary one state. The unique power-up process insures that the external device (800) is only powered when present and protects CMOS devices in the interface control circuitry from being inadvertently destroyed.

39 Claims, 4 Drawing Sheets

EXTERNAL INTERFACE CONTROL CIRCUITRY FOR MICROCOMPUTER SYSTEMS

This is a continuation of application Ser. No. 618,115, filed June 7, 1984, now abandoned.

BACKGROUND OF THE INVENTION

The present invention relates generally to external interface circuitry for data processing systems, and more particularly to a controlled interface for coupling an external device to microcomputer systems.

In prior art computer systems, interface circuitry and peripherals have been typically added to such systems by means of buffering interface signals including address, data and control lines. In such systems, the interface circuitry is powered up when the computer system is switched on. Specialized interfaces, such as the RS-232 interface, have also been developed where special devices are required and special data transfer protocols are used. However, none of these prior art computer systems has a controlled interface which is powered up and powered down in an orderly fashion depending on whether an external device or peripheral is present.

OBJECTS AND SUMMARY OF THE INVENTION

Accordingly, it is an object of the present invention to provide improved interface control circuitry for coupling data processing circuitry to an external device.

It is the further object of the present invention to provide an improved interface control circuitry that powers up and down an external device depending on the presence and operating conditions thereof.

Briefly described, the present invention encompasses interface control circuitry for coupling data processing circuitry to an external device. The external device includes circuitry for producing an indication signal when it is coupled to the interface control circuitry and also circuitry for producing a ready signal in response to the application of power to the external device. The interface control circuitry comprises circuitry for applying power to the external device in response to a power control signal; and circuitry for applying interface signals from the data processing circuitry to the external device in response to an interface control signal. The data processing means is responsive to the external device indication signal for producing the power control signal and responsive to the external device ready signal for producing the interface control signal. Thus, both power and the interface signals from the data processing circuitry are not applied to the external device until both the external device indication signal indicates that the external device is coupled to the interface control circuitry and the external device produces the ready signal.

DETAILED DESCRIPTION OF THE PREFERRED EMBODIMENT

Figure 1:
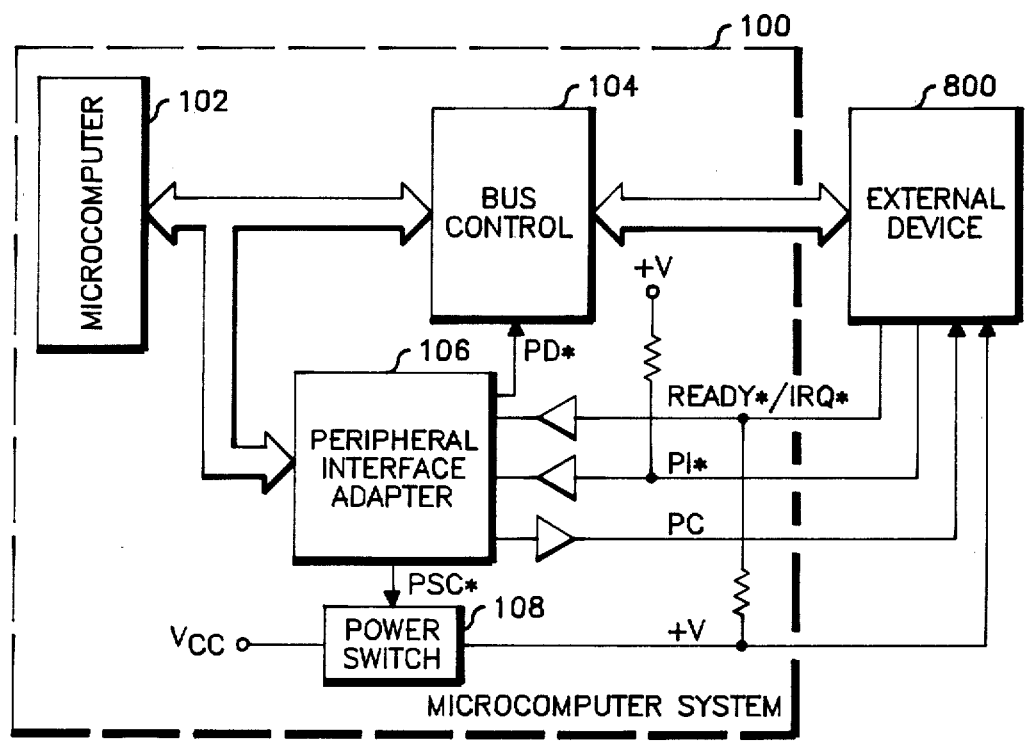
FIG. 1 is a block diagram of an external device and a microcomputer system embodying the present invention.

In FIG. 1 there is illustrated a data processing system including an external device 800 which is coupled to microcomputer system 100 embodying the present invention. External device 800 may be any of a number of peripheral devices such as, for example, read-only memories, random-access memories, printers, light pens, MODEMS and other data processing peripherals. Microcomputer system 100 includes microcomputer 102, bus control 104, peripheral interface adapter 106 and power switch 108.

In the preferred embodiment of the present invention, microcomputer 102 is a Motorola type M6801 single chip microcomputer, although any suitable computer or microcomputer could be utilized in practicing the present invention. Peripheral interface adapter 106 is a Motorola type MC146823 PIA. Power switch 108 is preferably an Intersil type ICL7663 programmable voltage regulator which converts $V_{cc}$ provided by a +7.5 V battery down to +V of +5 V.

Power switch 108 turns on or off in response to the PSC* control signal. Power switch 108 produces a switched +V supply voltage from the $V_{cc}$ supply voltage of the microcomputer system 100. The specific circuitry in bus control 104 is shown in more detail in FIG. 2. PIA 106 is coupled to microcomputer 102 by way of address, data and control lines and produces the peripheral disable signal PD* and peripheral control signal PC and receives the ready/interrupt request signal READY*/IRQ* and the peripheral inserted signal PI* from external device 800 by means of buffer gates. Pull up resistors couple the READY*/IRQ* signal and the PI* signal to corresponding supply voltages for maintaining these signals at preselected voltage states.

Figure 2:
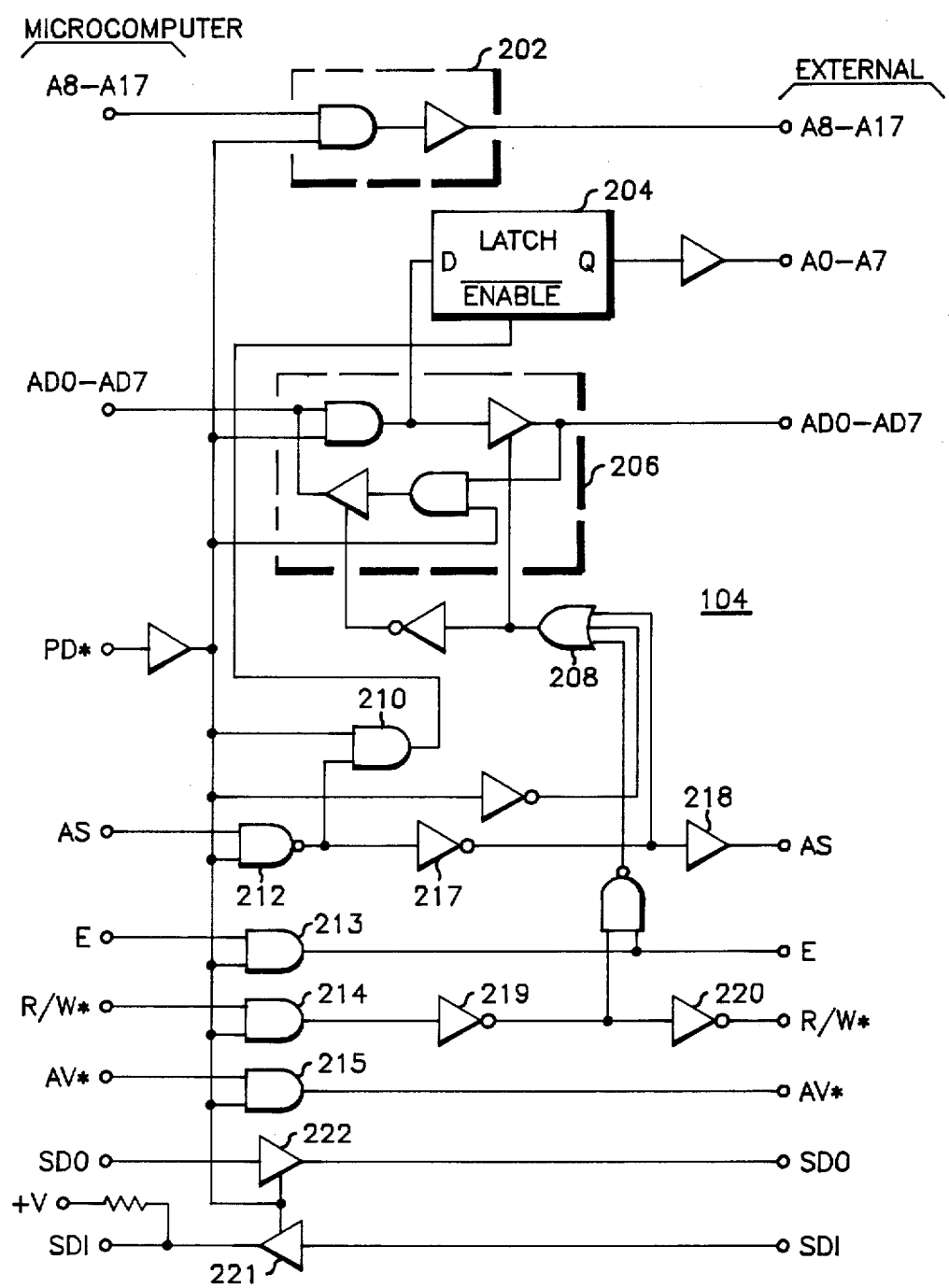
FIG. 2 is a detailed circuit diagram of the bus control in FIG. 1.

Referring next to FIG. 2, there is illustrated a detailed circuit diagram of bus control 104 in FIG. 1. Address signals A8–A17, address/data signals AD0–AD7 and control signals AS, E, R/W*, AV*, SDO and SDI from microcomputer 102 are coupled by bus control 104 to external device 800. All of the signals coupled by a bus control 104 between micrcomputer 102 and external device 800 are gated with the PD* signal such that whenever the external device 800 is disabled, all signals applied by bus control 104 to external device 800 are at a binary zero state. Since the preferred embodiment of bus control 104 is comprised of CMOS devices, it is preferable that all interface signals applied to external device 800 be at a binary zero state for preventing SCR latch-up of the CMOS devices. Moreover, the interface signals are not applied to external device 800 unless the external device 800 is present and has responded to system 100 with the READY* signal.

Referring more specfically to FIG. 2, address signals A8–A17 are gated with the PD signal and applied to external device 800 by means of eight gates, one of which is shown in block 202. The address/data signals AD0–AD7 are also gated with the PD* signal and applied to the external device by way of eight bidirectional gates, one of which is shown in block 206. Address signals present on the AD0–AD7 signals are demultiplexed and stored in latch 204 for application to external device 800 as address signals A0–A7. The control signal for enabling latch 204 is supplied by gate 210, and the control signal for controlling the tri-state buffers in gates 206 is supplied by or gate 208.

Interface signals AS, E, R/W* and AV are likewise gated with the PD* signal by gates 212, 213, 214 and 215, respectively and applied to external device 800. Serial interface signals SD0 and SDI are coupled by tri-state buffers 222 and 221, respectively, which are controlled by the PD* signal. The serial interface signals SD0 and SDI may be utilized with additional circuitry to provide a serial data interface, such as, for example an RS-232 interface.

Figure 3:
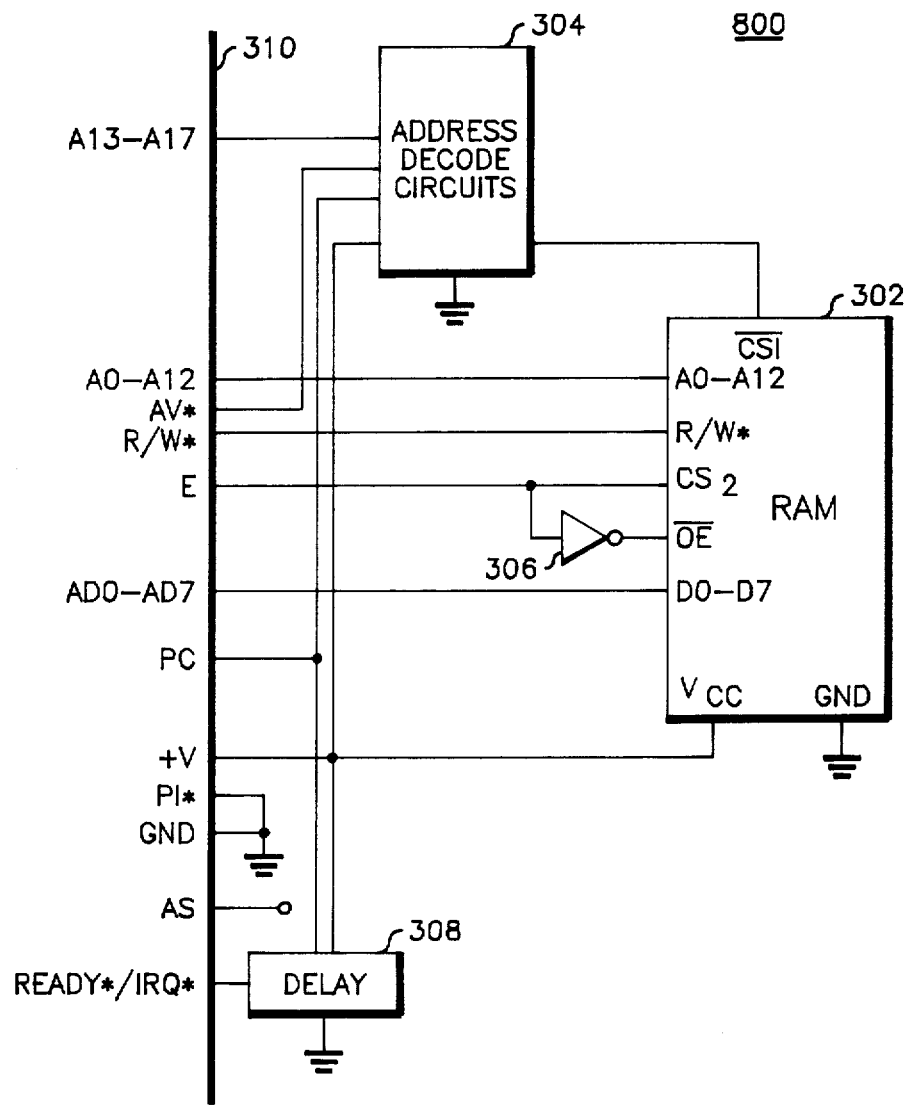
FIG. 3 is a detailed circuit diagram of a typical external device in FIG. 1.

Referring next to FIG. 3, there is illustrated a detailed circuit diagram of an external device 800 that includes a random-access memory (RAM) 302. RAM 302 together with address decode circuits 304 and delay gates 308 may be provided on a printed circuit board which is insertable into a connector of microcomputer system 100. When insrrted, signal PI* is coupled to ground for providing a signal indicating that RAM 302 has been inserted into microcomputer system 100. Delay circuit 308 is coupled to the PC signal and the +V voltage, and may consist of a number of cascaded buffer gates for producing the READY* signal. Address decode circuits 304 may include logic gates which are coupled to address signals A13-A17 and control signals AV* and PC for decoding a particular address assigned to RAM 302. Address signals A0-A12 are applied to the A0-A12 inputs of RAM 302. Data signals AD0-AD7 are applied to data inputs D0-D7 of RAM 302. Control signals R/W* and E are applied to inputs R/W* and CS2 of RAM 302. In addition, the control signal E is coupled to inverting gate 306 and applied to input OE* of RAM 302. RAM 302 may be an Hitachi HM6264 type 8KX8 RAM.

According to the present invention, RAM 302 is powered up by microcomputer system 100 whenever the microcomputer system requires the use of the memory locations provided thereby. Thus, for example, RAM 302 may be powered up when a particular subroutine requiring a large scratch pad memory is executed by microcomputer 102. Since it is desired to conserve current drain from the +V supply, RAM 302 need only be powered up when that particular subroutine is executed. This unique feature of the present invention minimizes current drain from the +V supply, which is typically sourced from a battery. Many other types of external devices 800, such as printers, read-only memories, telephone line MODEMs, RF MODEMs, light pens, and other data handling apparatus may be utilized with microcomputer system 100.

Figure 4:
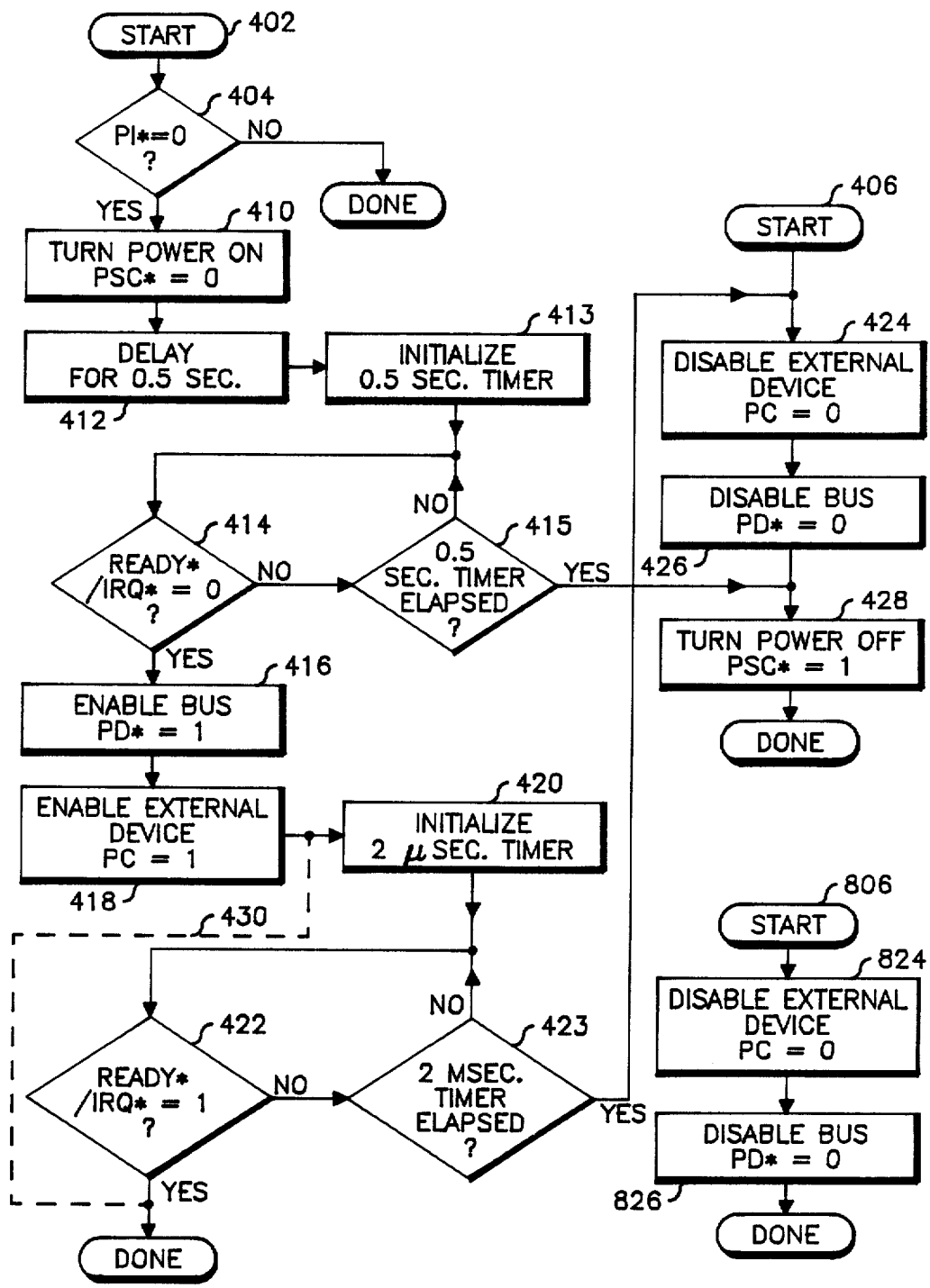
FIG. 4 is a flowchart of the process steps executed by the microcomputer in FIG. 1 for controlling an external device.

In FIG. 4, there is illustrated a detailed flowchart of the process steps executed by microcomputer 102 whenever external device 800 is powered up and powered down. When external device 800 is to be powered up, the flowchart in FIG. 4 is entered at START block 402. At decision block 404, a check is made to see if PI* signal has a binary zero state. If not, NO branch is taken to return. Whenever the PI* signal has a binary one state, an external device has not been inserted into microcomputer system 100. If the PI* signal has a binary zero state, YES branch is taken to block 410 where the power to the peripheral is turned on by producing a binary zero state of the PSC* signal. Next, at block 412, a 0.5 second delay is produced to allow time for the external device 800 to turn on and stabilize. Then, a block 413, a 0.5 second timer is initialized. The READY* signal is checked at decision block 414 to determine if it is a binary zero state. If not, NO branch is taken to decision block 415 where a check is made to determine if the 0.5 second timer has elapsed. If so, YES branch is taken to block 428 where the power is turned off by producing a binary one state of the PSC* signal. Otherwise, NO branch is taken back to decision block 414.

If the READY* signal has a binary zero state, YES branch is taken from decision block 414 in FIG. 4, to block 416 where the interface signals on the bus between bus control 104 and external device 800 are enabled by producing a binary one state of the PD* signal. Thereafter, at block 418 a binary one state is produced on the PC signal. The PC signal is used to enable the external device 800. In the case of RAM 302 in FIG. 3, the PC signal is part of the RAM address decoded by address decode circuits 304. At block 420, a two microsecond timer is initialized. Then, at decision block 422, a check is made to see if the READY* signal has a binary one state. If so, YSS branch is taken to return indicating that the external device 800 has been properly powered up. If not, NO branch is taken to decision block 423 where a check is made to see if the two microsecond timer has elapsed. If not, NO branch is taken back to decision block 422. Otherwise, YES branch is taken to block 424 for powering down the external device.

Once external device 800 is properly powered up, the READY*/IRQ* signal is treated as an IRQ* signal for interrupting microcomputer 102. The binary state of the IRQ* signal is changed to a binary zero state by external device 800 for requesting service. Once external device 800 is serviced, the IRQ* signal is changed back to a binary one state.

According to an alternative embodiment of the present invention, blocks 420, 422 and 423 may be bypassed as indicated by dotted line 430. In this mode of operation, the READY*/IRQ* signal is treated as an immediate request for service if the READY*/IRQ* signal remains at a binary zero state after the PC signal has changed to a binary one state. Once serviced, the external device 800 will change the READY*/IRQ* signal to a binary one state. This unique mode of operation is utilized in the preferred embodiment of the present invention.

Whenever external device 800 is to be powered down, blocks 406, 424, 426 and 428 are executed by microcomputer 102. External device 800 may be powered down whenever it is not needed or whenever the external device does not properly respond to the process steps executed by microcomputer 102 during the power up sequence. In other words, if external device 800 does not properly sequence the binary states of the READY* signal, the external device is powered down. The external device isppowered down if YES branch is taken from either decision block 415 or decision block 423. During the power down process, a binary zero state of the PC signal is produced at block 424. Next, at block 426, the bus between bus control 104 and external device 800 is disabled by producing a binary zero state of the PD* signal. Lastly, the power to external device 800 is turned off by producing a binary one state of the PSC* signal at block 428.

According to a further feature of the present invention, the external device need not be powered down when not in use but instead only disabled. This mode of operation is provided when microcomputer 102 executes blocks 806, 824 and 826. In this mode, a binary zero state of the PC signal is produced at block 824, and a binary zero state of the PD* signal is produced at block 826. If the external device 800 requires service, the binary state of the READY*/IRQ* signal can be changed to interrupt microcomputer 102. Once interrupted, microcomputer 102 executes the power-up flowchart beginning at START block 402.

The flowchart in FIG. 4 provides a detailed description of the process steps executed by microcomputer 102 for powering up and powering down external device 800. The coding of the process steps of the flowchart in FIG. 4 into the appropriate instructions of a suitable conventional microcomputer is a mere mechanical step for one skilled in the art. By way of analogy to an electrical circuit diagram, the detailed flowcharts in FIG. 4 are equivalent to a detailed schematic for an electric circuit where provision of the exact part values for the components of the electrical circuit corresponds to provision of the actual computer instructions for the blocks of the flowchart.

Figure 5:
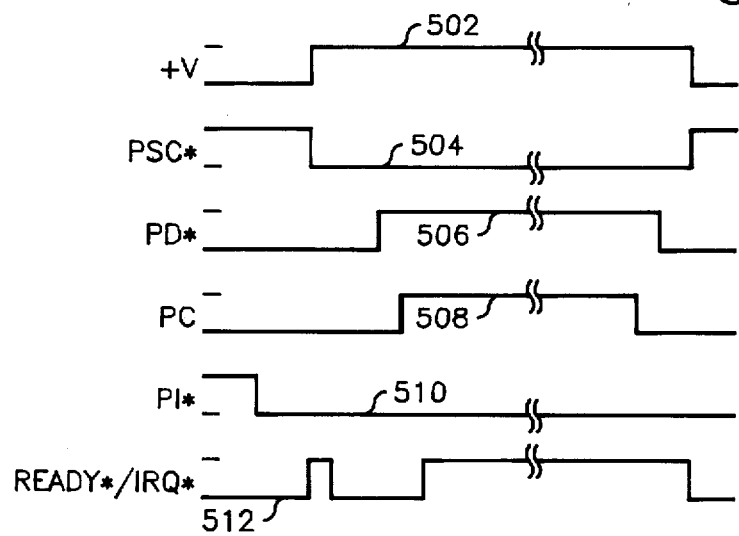
FIG. 5 is a timing diagram for selected signals coupled between the microcomputer system and external device in FIG. 1.

Referring next to FIG. 5, there is illustrated a timing diagram of selected control signals coupled between microcomputer system 100 and external device 800. Waveform 504 illustrates the PSC* signal which turns on and off power switch 108. When PSC* has a binary zero state, +V is applied to external device 800 by power switch 108. Before the power up process, a binary zero state is produced by external device 800 on the PI* signal, illustrated by waveform 510. Next, a binary zero state is produced on the PSC* signal. The READY* signal illustrated by waveform 512 then changes from a binary one state to a binary zero state. Next, the PD* signal changes from a binary zero to a binary one state as illustrated by waveform 506 for enabling the bus between bus control 104 and external device 800. The PC signal as illustrated by waveform 508 then changes state from a binary zero state to a binary one state for enabling operation of external device 800. Whenever it is desired to power down external device 800, the PC signal changes from a binary one state to a binary zero state, followed by change of the PD* signal from a binary one state to a binary zero state and lastly, by a change of the PSC* signal from a binary zero state to a binary one state. The changes in binrry state of the signals illustrated by the waveforms in FIG. 5 take place in the order shown although the time between the changes in binary state may vary depending on actual delays in both the microcomputer system 100 and external device 800.

In summary, unique interface control circuitry has been described for coupling data processing circuitry to an external device. The external device is powered up and down according to a unique process that insures that the interface circuitry is only powered up when an external device is present and that the state of the interface signals is controlled to prevent destruction of devices in the interface control circuitry. The interface control circuitry of the present invention can be utilized in any application where data processing circuitry interfaces to an external device.

We claim:

1. Interface control circuitry for coupling processing means interface signals to an external device that is insertable in said interface control circuitry, said external device having means for producing an indication signal when the external device is inserted and coupled to the processing means interface signals, and said external device having means for producing a ready signal in response to the application of power to the external device, said interface control circuitry comprising:

switching means for applying power to the external device in response to a power control signal;

gating means for applying the processing means interface signals only in response to an interface control signal; and processing means for producing the processing means interface signals, said processing means being rssponsive to the external device indication signal for producing the power control signal and a predetermined time delay, and after the predetermined time delay has elapsed, said processing means being responsive to the external device ready signal for producing the interface control signal.

2. The interface control circuitry according to claim 1, wherein said processing means is responsive to the absence of the external device indication signal for removing the power control signal, thereby disabling said switching means and removing power from the external device.

3. The interface control circuitry according to claim 1, wherein said processing means is responsive to the absence of the external device indication signal and ready signal for removing the power control signal, thereby disabling said switching means and said gating means and removing power and the processing means interface signals from the external device.

4. The interface control circuitry according to claim 1, wherein said processing means further is responsive to the external device ready signal for producing a device control signal, said external device including means responsive to the device control signal for enabling operation thereof.

5. The interface control circuitry according to claim 1, wherein said gating means includes means for combining the processing means interface signals and the interface control signal to produce combined signals for application to the external device.

6. The interface control circuitry according to claim 1, wherein said processing means is responsive to subsequent changes in state of the external device ready signal for servicing said external device.

7. The interface control circuitry according to claim 1, wherein said processing means disables said gating means when the external device is not being used.

8. The interface control circuitry according to claim 7, wherein said processing means is responsive to changes in state of the external device ready signal for re-enabling said gating means.

9. The interface control circuitry according to claim 1, wherein the ready signal producing means of the external device changes the state of the ready signal from a first state to a second state in response to the application of power to the external device and a predetermined time interval thereafter changes the state of the ready signal from the second state to the first state in response to a device control signal, said processing means being responsive to the change in state of the external device ready signal from the first state to the second state for producing the interface control signal and a predetermined time interval thereafter producing the device control signal for servicing said external device.

10. The interface control circuitry according to claim 9, wherein said processing means is responsive to the absence of the external device indication signal for removing the power control signal, thereby disabling said switching means and removing power from the external device.

11. The interface control circuitry according to claim 9, wherein said processing means is responsive to the absence of a subsequent change in state of the external device ready signal from the second state to the first state for removing the power control signal, thereby disabling said switching means and removing power from the external device.

12. The interface control circuitry according to claim 9, wherein said processing means removes the device control signal when the external device is not being serviced.

13. The interface control circuitry according to claim 12, wherein said ready signal producing means includes means for changing the state of the ready signal to request service, said processing means being responsive to changes in state of the external device ready signal for reapplying the device control signal and servicing said external device.

14. A system comprising in combination:
   (a) an external device that is insertable in said system comprising:
      (i) means for producing an indication signal indicating that the external device is inserted in said system and coupled to processing means interface signals; and
      (ii) means for producing a ready signal in response to the application of power to the external device;
   (b) processing means for producing the processing means interface signals, said processing means being responsive to the external device indication signal for producing a power control signal and a predetermined time delay, and after the predetermined time delay has elapsed, said processing means being responsive to the external device ready signal for producing an interface control signal; and
   (c) interface control circuitry coupled to said processing means and said external device, comprising:
      (i) switching means for applying power to the external device only in response to the power control signal; and
      (ii) gating means for applying the processing means interface signals only in response to the interface control signal.

15. The system according to claim 14, wherein said processing means is responsive to the absence of the external device indication signal for removing the power control signal, thereby disabling said switching means and removing power from the external device.

16. The system according to claim 14, wherein said processing means is responsive to the absence of the external device indication signal and ready signal for removing the power control signal, thereby disabling said switching means and said gating means and removing power and the processing means interface signals from the external device.

17. The system according to claim 14, wherein said processing means further is responsive to the external device ready signal for producing a device control signal, said external device including means responsive to the device control signal for enabling operation thereof.

18. The system according to claim 14, wherein said gating means includes means for combining the processing means interface signals and the interface control signal to produce combined signals for application to the external device.

19. The system according to claim 14, wherein said processing means is responsive to subsequent changes in state of the external device ready signal for servicing said external device.

20. The system according to claim 14, wherein said processing means disables said gating means when the external device is not being used.

21. The system according to claim 20, wherein said processing means is responsive to changes in state of the external device ready signal for re-enabling said gating means.

22. The system according to claim 14, wherein the ready signal producing means of the external device changes the state of the ready signal from a first state to a second state in response to the application of power to the external device and a predetermined time interval thereafter changes the state of the ready signal from the second state to the first state in response to a device control signal, said processing means being responsive to the change in state of the external device ready signal from the first state to the second state for producing the interface control signal and a predetermined time interval thereafter producing the device control signal for servicing said external device.

23. The system according to claim 22, wherein said processing means is responsive to the absence of the external device indication signal for removing the power control signal, thereby disabling said switching means and removing power from the external device.

24. The system according to claim 22, wherein said processing means is responsive to the absence of a subsequent change in state of the external device ready signal from the second state to the first state for removing the power control signal, thereby disabling said switching means and removing power from the external device.

25. The system according to claim 22, wherein said processing means removes the device control signal when the external device is not being serviced.

26. The system according to claim 25, wherein said ready signal producing means includes means for changing the state of the ready signal to request service, said processing means being responsive to changes in state of the external device ready signal for reapplying the device control signal and servicing said external device.

27. A method for coupling processing means interface signals produced by processing means to an external device insertable in said processing means, said external device having means for producing an indication signal when the external device is inserted and coupled to the processing means interface signals, and, said external device having means for producing a ready signal in response to the application of power to the external device, said method comprising the steps of:
   switching power to the external device in response to a power control signal;
   gating the processing means interface signals to the external device only in response to an interface control signal;
   producing the power control signal and a predetermined time delay in response to the external device indication signal; and
   after the predetermined time delay has elapsed, producing the interface control signal in response to the external device ready signal.

28. The method according to claim 27, further including the step of removing power from the external device in response to the absence of the external device indication signal.

29. The method according to claim 27, further including the step of removing power and the processing means interface signals from the external device in response to the absence of the external device indication signal and ready signal.

30. The method according to claim 27, further including the step of producing a device control signal in response to the external device ready signal, said external device including means responsive to the device control signal for enabling operation thereof.

31. The method according to claim 27, wherein said interface signal applying step includes the step of combining the processing means interface signals and the interface control signal to produce combined signals for application to the external device.

32. The method according to claim 27, further including the step of servicing said external device in response to subsequent changes in state of the external device ready signal.

33. The method according to claim 27, further including the step of removing the processing means interface signals from the external device when the external device is not being used.

34. The method according to claim 33, further including the step of re-gating the processing means interface signals to the external device in response to changes in state of the external device ready signal.

35. The method according to claim 27, wherein the ready signal producing means of the external device changes the state of the ready signal from a first state to a second state in response to the application of power to the external device and a predetermined time interval thereafter changes the state of the ready signal from the second state to the first state in response to a device control signal, said interface control signal producing step producing the interface control signal in response to the change in state of the external device ready signal from the first state to the second state and a predetermined time interval thereafter producing the device control signal for servicing said external device.

36. The method according to claim 35, further including the step of removing power from the external device in response to the absence of the external device indication signal.

37. The method according to claim 35, further including the step of removing power from the external device in response to the absence of changing the state of the external device indication signal from the second state to the first state.

38. The method according to claim 35, wherein said interface control signal producing step includes the step of removing the device control signal when the external device is not being serviced.

39. The method according to claim 38, wherein said ready signal producing means includes means for changing the state of the ready signal to request service, said interface control signal producing step produces the device control signal for servicing said external device in response to changes in state of the external device ready signal.

* * * * *